United States Patent
Potencsik et al.

(10) Patent No.: US 6,251,351 B1
(45) Date of Patent: Jun. 26, 2001

(54) WET-PROCESS TECHNIQUE FOR REFINING PHOSPHORIC ACID

(75) Inventors: Istvan Potencsik; Alexander Maurer, both of Mannheim (DE)

(73) Assignee: BK Giulini Chinie GmbH & Co., OHG, Deutschland (DE)

(*) Notice: Subject to any disclaimer, the term of this patent is extended or adjusted under 35 U.S.C. 154(b) by 0 days.

(21) Appl. No.: 09/155,448

(22) PCT Filed: Feb. 2, 1998

(86) PCT No.: PCT/EP98/00536

§ 371 Date: Aug. 20, 1999

§ 102(e) Date: Aug. 20, 1999

(87) PCT Pub. No.: WO98/33741

PCT Pub. Date: Aug. 6, 1998

(30) Foreign Application Priority Data

Feb. 3, 1997 (DE) .............................. 197 03 884

(51) Int. Cl.⁷ .............................................. C01B 25/16
(52) U.S. Cl. ........................................ 423/320; 423/321.2
(58) Field of Search ................................ 423/321.2, 320

(56) References Cited

U.S. PATENT DOCUMENTS

| | | | |
|---|---|---|---|
| 3,118,661 | 1/1964 | Cobb et al. | 267/110 |
| 3,556,739 | 1/1971 | Baniel et al. | 23/312 |
| 3,903,247 | * 9/1975 | Blumberg et al. | 423/321 |
| 3,970,741 | * 7/1976 | Pavonet | 423/321.2 |
| 3,996,336 | * 12/1976 | Wojtech et al. | 423/321.2 |
| 4,152,402 | * 5/1979 | Walters, Jr. et al. | 423/321.2 |
| 4,207,303 | * 6/1980 | Ishibashi et al. | 423/321.2 |
| 4,585,636 | * 4/1986 | Iosef et al. | 423/321.2 |
| 4,643,883 | * 2/1987 | Borchert et al. | 423/321.2 |
| 4,877,594 | 10/1989 | Bierman et al. | 423/321 |

FOREIGN PATENT DOCUMENTS

| | | | |
|---|---|---|---|
| 2101759 | * 8/1971 | (DE) | 423/321.2 |
| 2053885 | * 1/1973 | (DE) | 423/321.2 |
| 2065381 | 5/1973 | (DE) | C01B/25/18 |
| 2 217 141 | 10/1973 | (DE) | |
| 2320877 | 11/1973 | (DE) | R01B/25/22 |
| 2 321 751 | 11/1974 | (DE) | |
| 23 34 019 | 1/1975 | (DE) | |
| 24 32 526 | 11/1976 | (DE) | |
| 2657189 | 6/1978 | (DE) | R01B/25/46 |
| 24 47 390 C3 | 11/1983 | (DE) | |
| 31 43 154 C2 | 1/1992 | (DE) | |
| 0111802 | 6/1984 | (EP) | R01B/25/234 |
| 2 100 765 | 6/1973 | (FR) | |
| 2 249 833 | 10/1978 | (FR) | |
| 2 374 262 | 10/1982 | (FR) | |
| 1049197 | * 11/1966 | (GB) | 423/321.2 |
| 1050961 | * 12/1966 | (GB) | 423/321.2 |
| 77014 | * 5/1982 | (JP) | 423/321.2 |

\* cited by examiner

*Primary Examiner*—Wayne Langel
(74) *Attorney, Agent, or Firm*—Venable; George H. Spencer; Ashley J. Wells

(57) ABSTRACT

A process for purification by multistage countercurrent extraction of wet-process phosphoric acid includes the steps of (a) preparing an aqueous phosphoric acid by decomposition of crude phosphates with sulfuric acid and prepurification thereof; (b) providing an organic solvent mixture consisting of one of (A) a water immiscible solvent and a fully water-miscible solvent or (B) a partially water-miscible solvent and a fully water-miscible solvent; (c) extracting water from the acid by contacting with the solvent mixture in a volumetric ratio of acid to solvent mixture of 1:1 to 1:10 at a temperature of 5 to 90° C.; (d) recovering the fully water-miscible solvent by distillation and washing; (e) recycling the fully water-miscible solvent to step (b) to provide a recycled solvent mixture; and (f) repeating steps (c), (d) and (e) with the recycled solvent mixture to provide a phosphoric acid having a preselected degree of purity.

13 Claims, 2 Drawing Sheets

US 6,251,351 B1

WET-PROCESS TECHNIQUE FOR REFINING PHOSPHORIC ACID

BACKGROUND OF THE INVENTION

1. Field of the Invention

The present invention relates to a process for the purification by an organic solvent mixture of an aqueous phosphoric acid which was obtained by the wet process. The process is carried out by the counter-current extraction principle in a plurality of stages.

2. Description of the Related Art

Wet-process phosphoric acid, in the present invention, is taken to mean an aqueous phosphoric acid which has been prepared by decomposition of crude phosphate using acid, preferably sulphuric acid, and which has a $P_2O_5$ concentration between 40 and 62% by weight. An acid of this type contains a number of inorganic impurities which interfere with the further use of this acid and must be removed.

To produce pure phosphoric acid by extraction with organic solvents which are water-immiscible or only partially miscible with water, a large number of processes have already been proposed. In the processes which have been disclosed, solvents such as alcohols, ketones, ethers and esters of phosphoric acid are used.

However, there are only a few proven processes in practical use. All processes have the disadvantage that the solvents used are not able to take up the water present in the wet-process phosphoric acid. This means that the degree of extraction, i.e. the yield of phosphoric acid that can be achieved, is determined by the decreased water uptake capacity of the solvent. For this reason, the circulated partially water-miscible organic solvent, in particular the alcohols, must be completely or partially dehydrated. Processes of this type are described, for example, in DE-C 23 21 751, DE-C 23 34 019, DE-C 21 27 141 and DE-C 26 57 189. The degree of extraction is known to be dependent on the $P_2O_5$ concentration of the crude acid, on the number of extraction stages, on the solvent to acid ratio and on the amount of recycled wash water.

In EP-A1 0 111 802, the partition coefficient when anhydrous alcohol is used is comparatively greater than when water-saturated alcohols are used. The $P_2O_5$ yield is here only 50 to 60% by weight. Nevertheless, this makes little difference to the fact that to achieve maximum yields, a high number of extraction stages are required and, at the same time, a high solvent to acid ratio of 8:1 to 20:1 is required.

Wet-process phosphoric acid may also be extracted by the so-called splitting process. This process is based on the fact that only a proportion of the $P_2O_5$, approximately 40–60% by weight, is extracted from the crude acid.

A typical procedure is described in U.S. Pat. No. 3,318,661. According to this, the crude acid containing approximately 48–62% by weight of $P_2O_5$ is extracted with isopropyl ether in a weight ratio of 1:0.5 to 1.5, about 40% of the $P_{25}$ passing into the organic phase. The purified phosphoric acid is produced from the isopropyl ether extract by adding sufficient water for an aqueous phosphoric acid solution having a $P_2O_5$ content of 48% by weight to be separated out from the organic phase. It is a disadvantage in this process that the isopropyl ether extract cannot be washed and therefore only a low-quality phosphoric acid can be prepared. It is not possible to set a higher acid to solvent ratio to achieve a higher selectivity, since a third phase is then formed.

A further disadvantage of this process is that the crude acid must be concentrated from approximately 48% by weight of $P_{25}$ at least to 57% by weight of $P_2O_5$, in order to achieve a $P_{25}$ yield of 60%.

Improvement in selectivity has been described in U.S. Pat. No. 3,903,247, according to which the crude acid is extracted with a solvent mixture consisting of 75–95% of a water-immiscible C2-C5 ether and 5–25% of a lower C3-C8 alcohol. A particular disadvantage of this process is the poor yield and also, especially, the fact that an excessive amount of acid remains in the raffinate. The quality of the acid that is prepared must be classified principally only as "technical grade", i.e. it is not possible to prepare a higher quality without great expenditure on equipment.

Further extraction processes are described in DE-A 2,320,877 and U.S. Pat. No. 3,556,739, in which dialkyl ketones are used as solvent in a weight ratio to the acid of 0.5 to 2.0:1. An advantage of this process is the fact that the ketone extract, in contrast to the ether extract, can be purified by washing with water or phosphoric acid. The quality of the purified phosphoric acid is moderate, for which reason a further more complex purification step by concentration and crystallization of the phosphoric acid must also be carried out.

The object was therefore to eliminate the disadvantages occurring in the known extraction processes, in particular to prepare a phosphoric acid in high purity and at high yield. Such high-purity phosphoric acids are required in the food industry, for example.

SUMMARY OF THE INVENTION

The object set was surprisingly achieved according to the present process, which is characterized in that a prepurified phosphoric acid is extracted with recirculated solvent mixture in an extraction comprising one or more stages, which solvent mixture comprises a water-immiscible solvent or only partially water-miscible solvent and a fully water-miscible solvent, the mixing ratio being selected in such a manner that the mixture can take up the free water from the phosphoric acid. The prepurified phosphoric acid is mixed with the solvent mixture and this phase is then washed with a solution containing alkali metal and/or ammonium ions in a multistage countercurrent treatment and the wash solution is then recycled back to the feed phosphoric acid or to the extraction stage.

Figure 1:
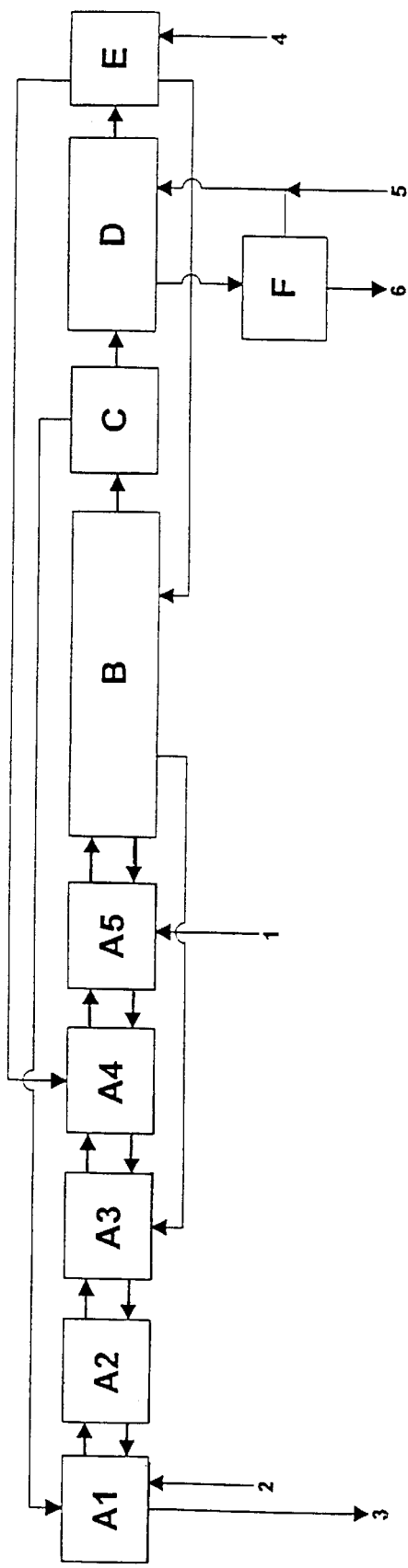
FIG. 1 is a flow diagram of the process according to one embodiment of the invention.
Figure 2:
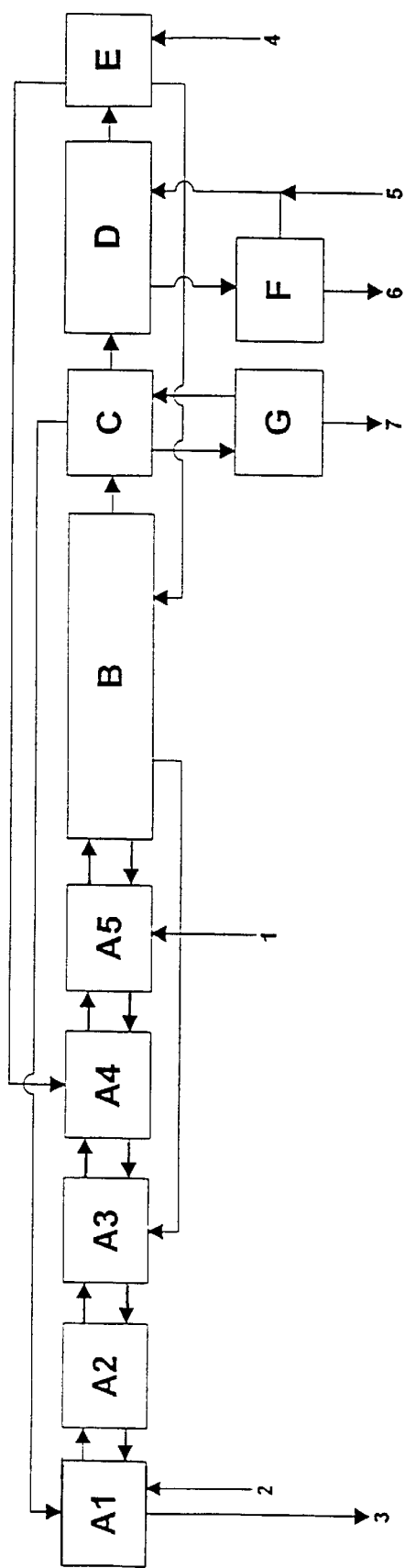
FIG. 2. is a flow diagram of the process according to another embodiment of the invention.

The process according to the invention comprises the following process steps, the numbers and letters listed here relating to FIGS. 1 and 2:

A(5) The prepurified phosphoric acid, possibly also containing alkali metal ions, is mixed with the solvent mixture and subjected to a counter-current multistage extraction comprising 3–5 mixer-settler extractor units. This produces a bottom phase and a top phase, also termed extract. The resulting bottom phase is further treated in 1 to 3 extractor units with the fully water-miscible solvent, depending on whether sulphuric acid is added to the bottom phase.

A(4) Here, the bottom phase from A(5) is mixed with the water-soluble and water-insoluble solvent and extracted again. The bottom phase principally contains water, free acid and cations such as aluminium, magnesium, iron etc. in the form of their phosphate salts.

A(2)–A(3) The bottom phase arriving from A(4) is mixed with the extract of the stages A(2) and A(1) in order to remove a portion of the sulphate ions from the organic (solvent-containing) phase of the stages A(2) and A(3).

A(1) The aqueous phase from A(2) and A(3) is admixed with sulphuric acid and again extracted with the water-soluble solvent.

If preparation of a substantially sulphate-free phosphoric acid is desired, it is advisable not to add sulphuric acid to the extraction stage. In this case, 3 extractor units in total are sufficient, with the consequence that the $P_{25}$ loss in the raffinate is between 8 and 15% by weight, depending on the cation and sulphate content in the phosphoric acid used. In order to be able to decrease the $P_{25}$ loss in the raffinate to 2–4% by weight, the sulphuric acid must be added to the bottom phase. It is advisable to add the sulphate ions in the form of sulphuric acid in an amount equivalent to the cations in the feed acid. In this case, up to 5 extractor units are used. The raffinate produced at this point, which still contains small amounts of solvent (approximately 10 to 15 g/l), is distilled and the residual raffinate is conducted away as waste.

A(5) The extract produced here, which is a phase containing solvent mixture/phosphoric acid/water, is washed with an acidic alkali metal phosphate solution in B in a battery of 7 mixer-settler extractor units operated in countercurrent. The volumetric ratio of wash solution to extract is between 0.02 and 0.03:1. The number of extraction stages can be varied depending on the desired purity. The more stages through which the phosphoric acid passes, the higher the degree of purity.

C. The washed phase containing solvent mixture/phosphoric acid/water is passed into a continuous distillation apparatus (C) in order to separate off the lower-boiling fully water-miscible solvent and, after it is cooled to approximately 30° C., to pass it into the multistage extraction stage A(4). In this operation, a two-phase system is achieved, since the organic solvent is supersaturated with respect to the water.

D. The water-insoluble solvent mixture which remains after the distillation from stage C and which still contains acid, is washed with the condensate from stage F. A dilute acid thus accumulates in the aqueous phase. In general, the water is not sufficient for reextracting the acid. Since water is taken off from the system together with the raffinate, a small amount of water must additionally be added.

F. The phosphoric acid produced from D is concentrated in an evaporator to a $P_{25}$ content of 45%, and can be separated off in F.

E. The water-immiscible or partially water-miscible solvent phase, after the reextraction stage, still contains about 5 to 8% by weight of $P_2O_5$, based on the feed $P_2O_5$, which phase is treated in the neutralization stage E with a 50% strength alkali metal hydroxide solution to pH 2 in a mixer-settler extractor unit, an acidic alkali metal phosphate solution being produced which is recycled to the wash stage B. The water-saturated solvent is passed to the extraction stage A(4).

As water-immiscible solvents or only partially water-miscible solvents, use can be made of aliphatic or cyclic $C_4$–$C_1$ ketones or ethers or $C_4$–$C_8$ alcohols. Such solvents are, for example, methyl isopropyl ketone, diisopropyl ketone, methyl i-butyl ketone, diisobutyl ketone, cyclohexanone, diisopropyl ether, diisobutyl ether, i-amyl alcohol, hexanol.

As fully water-miscible solvents, use can be made of $C_1$–$C_3$ alcohols, e.g. methanol, ethanol and i-propanol and n-propanol or acetone.

It is of importance in the process according to the invention that, in the solvent mixture, the fully water-miscible solvent has a lower boiling point than the water-immiscible solvent or only partially water-miscible solvent.

The suitable mixing ratio of the two solvents shall be selected in such a manner that the solvent mixture has the water uptake capacity required.

The commercially available wet-process phosphoric acids have a $P_2O_5$ content of 50–55% by weight, depending on cation and sulphate content. The following solvent mixtures, for example, are suitable for these phosphoric acids:

i-amyl alcohol/Iisopropanol in a volumetric ratio of 90:10 to 60:40, methyl i-butyl ketone/isopropanol in a volumetric ratio of 80:20 to 50:50, diisobutyl ether/isopropanol in a volumetric ratio of 70:30 to 50:50.

The volumetric ratio of phosphoric acid to organic solvent mixture is 1:1 to 1:10, preferably 1:2 to 1:6.

If ether is used as solvent, the reextraction or washing stage is unnecessary, since ethers have a negative temperature gradient in relation to the dissolution of phosphoric acid and, after distilling off the fully water-miscible solvent at temperatures between 50 and 80° C., the dissolved phosphoric acid separates out with the water. This phosphoric acid has a $P_2O_5$ content of approximately 50% by weight, if the water which is formed on concentration of the phosphoric acid to 55% by weight of $P_2O_5$ is passed to the distillation. The temperature during the overall extraction can be between 5 and 90° C., preferably it is 30–80° C.

The alkali metal content, calculated as oxide, should be 0.1 to 3% by weight, preferably 0.1 to 1% by weight, based on the phosphoric acid, in the extraction and/or prepurification stage of the wet-process phosphoric acid by the organic solvent mixture. The alkali metal content in the phosphoric acid is adjusted by mixing with the recycled wash solution either in the prepurification or during the extraction. Depending on the origin of the phosphoric acid, it contains greater or lesser amounts of impurities in the form of $Al_2O_3$, MgO, etc. These cations form stable hydrates in the form of water complexes and thus bind the water in the crude acid.

If the $Al_2O_3$ content of the acid is above 0.6% by weight, e.g. in the case of acid from Morocco, it is advisable to add the alkali metal ions during the prepurification. If the $Al_2O_3$ content of the acid is above 1% by weight, e.g. in the case of acid originating from North Carolina/USA or from Israel, the wash solution containing the alkali metal ions should be admixed with water-miscible solvent during the extraction.

Prepurification of the wet-process phosphoric acid for the extraction is always necessary.

The prepurification can comprise not only precipitation reactions with $CaCO_3$ or crude phosphate, sodium sulphide and active silicic acid, in order to remove the dissolved arsenic and the fluoride and sulphate ions, but also adsorption processes using activated carbon in order to eliminate the organic impurities.

DESCRIPTION OF THE PREFERRED EMBODIMENTS

The subject-matter of the invention is described in more detail with reference to drawings 1 and 2 which represent the process according to the invention in a flow diagram, and by examples.

FIG. 2 shows a further variant according to the invention of the process. By means of this variant it is possible to obtain the isolated phosphoric acid in two quality grades, in a technical and a high-purity quality grade. In this case, the process is carried out as described in FIG. 1, but with the difference that the number of extractors in the wash stage B can be reduced from 7 to 4. The aqueous phosphoric acid separated out, which is formed after the evaporation of the fully water-miscible solvent in the distillation apparatus, is separated off and concentrated (in g) in the evaporator to a technical quality grade up to a $P_2O_5$ content of 55% by weight. The resulting water can be fully or partially recycled to the distillation apparatus, in order to control the amount of the aqueous phosphoric acid.

Example 1

A wet-process phosphoric acid produced from Morocco phosphate is mixed with the wash solution from the purification stage B, FIG. 1, and treated in a manner known per se with silicic acid, crude phosphate, sodium sulphide and activated carbon.

The phosphoric acid thus prepurified has the following contents:

| | | | |
|---|---|---|---|
| $P_2O_5$ | 53% by weight | MgO | 0.59% by weight |
| $SO_4^{2-}$ | 1.5% by weight | $Na_2O$ | 0.60% by weight |
| $Fe_2O_3$ | 0.43% by weight | As | <1 ppm |
| $Al_2O_3$ | 0.63% by weight | | |

In this example, a solvent mixture consisting of 70% by volume of i-amyl alcohol and 30% by volume of isopropanol was used. The volumetric ratio of phosphoric acid to alcohol mixture was 1:5.

10 l/h of this phosphoric acid are treated at a temperature of 25° C. with approximately 51 l/h of a phase from stage A(4) containing alcohol mixture/phosphoric acid/water. 3.4 l/h of an aqueous bottom phase are produced continuously in the separation vessel. This bottom phase is again intimately mixed in stage A(4) with 35 l/h of circulated water-saturated i-amyl alcohol and 16 l/h of a phase from stage A(3) comprising isopropanol/phosphoric acid/sulphuric acid/water. The aqueous bottom phase from stage A(2) is mixed with 0.28 /h of a 94% strength sulphuric acid and extracted in counter-current in the stages A(1) to A(3) with 15 l/h of isopropanol from the distillation stage.

In this treatment, 1.8 l/h of an aqueous bottom phase having a $P_2O_5$ content of 9% by weight are produced, which corresponds to a $P_2O_5$ loss of 2.9% by weight based on the feed $P_2O_5$. It can be used in fertilizer production.

The top phase from the extraction stage A(5) comprising alcohol mixture/phosphoric acid/water is washed in counter-current in a battery (B) of 7 mixer-settler vessels with wash solution which comprises alkali metal ions and phosphoric acid and is formed by addition of sodium hydroxide solution to the neutralization stage (E) at the end of the process. After this treatment, 1.5 l/h of wash solution are produced which are passed to the prepurification stage of the wet-process phosphoric acid.

The washed phase comprising alcohol mixture/phosphoric acid/water is passed to a continuous distillation apparatus and 15 l/h of isopropanol are evaporated at a temperature of 80–82° C. The isopropanol is passed to the extraction stage A(1).

In this operation, a two-phase system is achieved, since the i-amyl alcohol is supersaturated with respect to water.

The phosphoric acid is reextracted from the two-phase system with 6.8 l/h of water in counter-current in a battery of 4 mixer-settler vessels. This produces 14.7 l/h of a purified phosphoric acid having a $P_2O_5$ content of 40% by weight, which is concentrated in an evaporator to a concentration of 55% by weight of $P_2O_5$. 5.5 l/h of condensate water are produced, which are used in the washing stage. The yield of $P_2O_5$ is 97.2%. The water-saturated i-amyl alcohol phase, which still contains some phosphoric acid, is neutralized to pH 2 with 0.18 l/h of a 50% strength sodium hydroxide solution. 1.2 l/h of a sodium phosphate solution are produced in the separation vessel. This solution is used in the purification stage. The water-saturated i-amyl alcohol is passed to the extraction stage A(4). The analytical data show the degree of purity of the purified phosphoric acid in ppm, based on % $P_2O_5$:

| | | | |
|---|---|---|---|
| $SO_4^{2-}$ | <600 | Ni | <1 |
| CaO | <5 | Cr | <1 |
| MgO | <10 | Cu | <1 |
| $Al_2O_3$ | <10 | Zn | <2 |
| $Fe_2O_3$ | <5 | Cd | <1 |
| | | V | <1 |

Example 2

In this experiment, the same alcohol mixture as described in Example 1 is used. The volumetric ratio alcohol mixture:phosphoric acid is 4:1, however. A commercially available prepurified green phosphoric acid which was prepared by digesting calcined Israeli phosphate with sulphuric acid is used. It has the following chemical composition:

| | | | |
|---|---|---|---|
| $P_2O_5$ | 54% by weight | $Al_2O_3$ | 1.92% by weight |
| $SO_4^{2-}$ | 2.5% by weight | Cd | 6 ppm |
| MgO | 0.51% by weight | As | <1 ppm |
| CaO | 0.08% by weight | $Na_2O$ | 0.09% by weight |
| $Fe_2O_3$ | 0.5% by weight | | |

10 l/h of this phosphoric acid are passed through in a similar manner to the process described in Example 1, but with the difference that the extraction is only performed in one battery of a total of 3 mixer-settler vessels in such a manner that the green phosphoric acid is extracted in stage A(3) with 41 l/h of the phase from stage A(2) which comprises alcohol mixture/phosphoric acid/water. The bottom phase produced in this case is treated once more in stage A(2) with 28 l/h of water-saturated and circulated i-amyl alcohol and 13 l/h of phase from extraction stage A(1) comprising isopropanol/phosphoric acid/water. The bottom phase from stage A(2) is continuously mixed with the wash solution from the purification battery (FIG. 1, B) and, without sulphuric acid addition, is extracted in stage A(1) with 12 l/h of circulated isopropanol, 2 l/h of an aqueous raffinate having a $P_2O_5$ content of 22% by weight being produced, which corresponds to a $P_2O_5$ loss of 8% by weight, based on the feed $P_2O_5$.

Further action is carried out as described in Example 1.

In the reextraction of the purified phosphoric acid with water, 13 l/h of pure phosphoric acid having a $P_2O_5$ content of 43% by weight are produced, which corresponds to a yield of $P_2O_5$ of 92%.

The analytical data of the phosphoric acid produced are summarized in the listing below in ppm based on % $P_{25}$:

| | | | | | |
|---|---|---|---|---|---|
| $SO_4^{2-}$ | <100 | $Fe_2O_3$ | <5 | Zn | <1 |
| MgO | <5 | Ni | <1 | V | <1 |
| CaO | <5 | Cr | <1 | Cd | <1 |
| $Al_2O_3$ | <10 | Cu | <1 | As | <1 |

Example 3

In this example, a solvent mixture consisting of 60% by volume of diisobutyl ether and 40% by volume of isopropanol was used. The volumetric ratio of phosphoric acid to solvent mixture was 1:4.

10 l/h of green phosphoric acid used in Example 2 are extracted with 40 l/h of solvent mixture as described in Example 1. The difference from Example 1 is that the bottom phase from stage A(4) is continuously mixed with the wash solution from the battery B (FIG. 1, B) and extracted with 16 l/h of phase from stage A(2) comprising isopropanol/phosphoric acid/sulphuric acid/water. The bottom phase from stage A(2) is mixed with 0.2 l/h of a 94% strength sulphuric acid and extracted in counter-current in the stages A(1) to A(3) with 16 l/h of isopropanol from the distillation stage. 1.7 l/h of raffinate having a $P_2O_5$ content of 10.5% by weight are produced in stage A(1), which corresponds to a $P_2O_5$ loss of 2.99%, based on the feed $P_2O_5$.

After the solvent mixture/phosphoric acid/water phase is purified by washing, it is admixed with 2.5 l/h of water (from the phosphoric acid evaporation unit), and the isopropanol is distilled off as azeotrope in a continuous distillation apparatus at a temperature between 80 and 83° C.

The residue, consisting of ether, phosphoric acid and water, separates into two phases at this temperature, the aqueous phase containing virtually all of the phosphoric acid and having a $P_2O_5$ content of 50% by weight. 10.7 l/h of an aqueous phosphoric acid are produced. The yield of $P_2O_5$ is 97%, based on the feed $P_2O_5$. The phosphoric acid thus produced is concentrated in an evaporator to a $P_2O_5$ content of 55% by weight. The resulting condensate, approximately 2.5 l/h, is passed to the distillation apparatus.

The ether phase still contains some phosphoric acid, which is washed out with 1.0 l/h of a 10% strength sodium hydroxide solution.

This alkaline phosphate-containing solution is used as wash solution in the purification stage.

The composition of the pure acid in ppm, based on % $P_2O_5$:

| | | | | | |
|---|---|---|---|---|---|
| $SO_4^{2-}$ | <600 | Ni | <1 | Cd | <1 |
| $Al_2O_3$ | <10 | Cr | <1 | As | <1 |
| $Fe_2O_3$ | <5 | Cu | <1 | | |
| MgO | <10 | Zn | <1 | | |
| CaO | <5 | V | <1 | | |

Example 4

In this example, a solvent mixture consisting of 60% by volume of methyl isobutyl ketone and 40% by volume of isopropanol is used; the volumetric ratio of solvent mixture to phosphoric acid is 4:1.

10 l/h of green prepurified phosphoric acid are extracted with 40 l/h of solvent mixture as described in Example 3. 1.5 l/h of an aqueous raffinate having a $P_2O_5$ content of 11% by weight are produced, which corresponds to a $P_2O_5$ loss of 3%, based on the feed $P_2O_5$. In the reextraction stage, 13.5 l/h of a purified phosphoric acid having a $P_2O_5$ content of 40% by weight are isolated using 6 l/h of water. The yield is 97%.

The analytical data of the pure acid are summarized in the listing in ppm based on % $P_2O_5$:

| | | | | | |
|---|---|---|---|---|---|
| $SO_4^{2-}$ | <600 | Ni | <1 | Cd | <1 |
| $Al_2O_3$ | <10 | Cr | <1 | As | <1 |
| $Fe_2O_3$ | <5 | Cu | <1 | | |
| MgO | <10 | Zn | <1 | | |
| CaO | <5 | V | <1 | | |

Example 5 (FIG. 2)

In this example, the process variant shown in FIG. 2 is carried out. The Moroccan phosphoric acid is pretreated as described in Example 1. The pretreated phosphoric acid has a $P_2O_5$ content of 53% by weight and an $SO_4^{2-}$ content of 3% by weight. 10 l/h of this acid are extracted with 50 l/h of alcohol mixture in a similar manner to Example 1, 1.9 l/h of an aqueous raffinate having a $P_2O_5$ content of 10% by weight being produced. The $P_2O_5$ loss is 3.4%.

The phase from extraction stage A(5) comprising alcohol mixture/phosphoric acid/water is washed with the wash solution in a battery of 5 mixer-settler vessels, 1.8 l/h of wash solution being produced.

The washed alcohol mixture extract is admixed with 1 l/h of condensate water and the isopropanol is evaporated as azeotrope in the distillation apparatus C. Two phases form. 5.9 l/h of aqueous bottom phase 5 having a $P_2O_5$ content of 46.9% by weight are continuously produced in the separation vessel. The aqueous phosphoric acid of technical-grade quality is concentrated in the evaporator G to a concentration of 55% by weight of $P_2O_5$. In this case, 1.4 l/h of condensate water are produced, of which 1 l/h is used in the distillation apparatus and 0.4 l/h is used in the reextraction stage.

The residual phosphoric acid is reextracted with 5.3 l/h from the i-amyl alcohol extract in a battery of 4 extractor units. 8.7 l/h of an aqueous phosphoric acid having a $P_2O_5$ content of 36% by weight are produced. This corresponds to a $P_2O_5$ yield of 49.7%.

Further action is performed as described in Example 1. The analytical data of the phosphoric acid thus produced in two quality grades are summarized in the listing in ppm based on % $P_2O_5$:

| | Technical-grade quality | Pure quality |
|---|---|---|
| $SO_4^{2-}$ | 1500 | <50 |
| $Al_2O_3$ | <60 | <1 |
| $Fe_2O_3$ | <50 | <1 |
| MgO | <100 | <1 |
| CaO | <10 | <1 |
| Ni | <2 | <1 |
| Cr | <2 | <1 |
| Cu | <2 | <1 |
| Zn | <50 | <1 |

-continued

|    | Technical-grade quality | Pure quality |
|----|-------------------------|--------------|
| V  | <10                     | <1           |
| Cd | <1                      | <1           |
| As | <1                      | <1           |

What is claimed is:

1. A process for purification by multistage countercurrent extraction of wet-process phosphoric acid, comprising the steps of:
   a. preparing an aqueous phosphoric acid containing inorganic impurities by decomposition of crude phosphates with sulfuric acid and prepurification thereof;
   b. providing an organic solvent mixture effective for water uptake and consisting of (A) a water immiscible solvent and a fully water-miscible solvent or (B) a partially water-miscible solvent and a fully water-miscible solvent;
   c. extracting water from the aqueous phosphoric acid by contacting the aqueous phosphoric acid with the organic solvent mixture in a volumetric ratio of aqueous phosphoric acid to organic solvent mixture ranging from 1:1 to 1:10 at a temperature during overall extraction which ranges from 5 to 90° C. to provide a purified phosphoric acid;
   d. recovering the fully water-miscible solvent from the organic solvent mixture by distillation and washing to provide a distilled and washed fully water-miscible solvent;
   e. recycling the distilled and washed fully water-miscible solvent to step (b) to provide a recycled organic solvent mixture; and
   f. repeating steps (c), (d) and (e) with the recycled organic solvent mixture to provide a phosphoric acid having a preselected degree of purity.

2. The process according to claim 1, wherein the temperature during overall extraction ranges from 30 to 80° C.

3. The process according to claim 1, wherein the volumetric ratio ranges from 1:2 to 1:6.

4. The process according to claim 1, wherein the fully water-miscible solvent has a lower boiling point than that of the water-immiscible solvent and the partially water-miscible solvent.

5. The process according to claim 1, wherein the water-immiscible solvent and the partially water-miscible solvent are selected from the group consisting of aliphatic $C_4$–$C_{10}$ ketones, cyclic $C_4$–$C_{10}$ ketones, and ethers of $C_4$–$C_8$ alcohols.

6. The process according to claim 1, wherein the water-immiscible solvent and the partially water-miscible solvent are selected from the group consisting of methyl isopropyl ketone, diisopropyl ketone, methyl i-butyl ketone, diisobutyl ketone, cyclohexanone, diisopropyl ether, diisobutyl ether, i-amyl alcohol, and hexanol.

7. The process according to claim 1, wherein the fully water-miscible solvent is selected from the group consisting of $C_1$–$C_3$ alcohols and acetone.

8. The process according to claim 7, wherein the $C_1$–$C_3$ alcohols are selected from the group consisting of methanol alcohol, ethanol alcohol, i-propanol alcohol, and n-propanol.

9. The process according to claim 1, further comprising neutralizing the distilled and washed fully water-miscible solvent prior to recycling thereof to step (b) with an alkali metal hydroxide so that the phosphoric acid in the prepurifying in step (a) and/or the extracting in step (c) has an alkali metal content, calculated as oxide, ranging from 0.1 to 3% by weight, based on the phosphoric acid.

10. The process according to claim 9, wherein the phosphoric acid has an alkali metal content, calculated as oxide, ranging from 0.4 to 1% by weight, based on the phosphoric acid.

11. The process according to claim 9, wherein the alkali metal content in the phosphoric acid is adjusted by mixing the phosphoric acid with recycled wash solution during prepurifying in step (a) or prior to extracting in step (c).

12. The process according to claim 1, wherein the solvent phase which forms after washing still contains phosphoric acid and is neutralized to a pH of 2 with aqueous alkali metal hydroxide.

13. The process according to claim 1, wherein prepurifying in step (a) comprises precipitating by reaction with $CaCO_3$ or crude phosphate, sodium sulfide and active silicic acid, and adsorption of impurities with activated carbon.

* * * * *